United States Patent

Krimmer et al.

[11] Patent Number: 5,992,396
[45] Date of Patent: Nov. 30, 1999

[54] TANK VENTING SYSTEM FOR MOTOR VEHICLES

[75] Inventors: Erwin Krimmer, Pluderhausen; Tilman Miehle, Kernen; Wolfgang Schulz, Bietigheim-Bissingen; Manfred Zimmermann, Bad Rappenau; Andreas Blumenstock, Ludwigsburg, all of Germany

[73] Assignee: Robert Bosch GmbH, Stuttgart, Germany

[21] Appl. No.: 09/091,511

[22] PCT Filed: Sep. 24, 1997

[86] PCT No.: PCT/DE97/02163

§ 371 Date: Jun. 19, 1998

§ 102(e) Date: Jun. 19, 1998

[87] PCT Pub. No.: WO98/19064

PCT Pub. Date: May 7, 1998

[30] Foreign Application Priority Data

Oct. 26, 1996 [DE] Germany ............. 196 44 610

[51] Int. Cl.⁶ ................................. F02M 37/04
[52] U.S. Cl. .......................... 123/519; 123/520
[58] Field of Search ................. 123/516, 518, 123/519, 520

[56] References Cited

U.S. PATENT DOCUMENTS 5,715,799 2/1998 Blomquist et al. ............ 123/520
5,730,107 3/1998 Blumenstock ................. 123/520

*Primary Examiner*—Thomas N. Moulis
*Attorney, Agent, or Firm*—Edwin E. Greigg; Ronald E. Greigg

[57] ABSTRACT

A tank venting system for motor vehicles, having an internal combustion engine supplied from a fuel tank. A filter housing with an adsorption filter, and an air inlet and an air outlet that can be connected to a venting neck of the fuel tank. An air pump device for error diagnosis, which is integrated with a pump housing that has a pump inlet and a pump outlet. To attain a compact design of the tank venting system that is economical in terms of installation space, the pump housing is mounted with the pump outlet oriented coaxially to the air inlet on the filter housing and secured on the filter housing by means of spring-elastic fastening elements. The transition between the pump outlet and the air inlet is sealed off in airtight fashion.

14 Claims, 3 Drawing Sheets

TANK VENTING SYSTEM FOR MOTOR VEHICLES

PRIOR ART

The invention is based on a tank venting system for motor vehicles with an internal combustion engine supplied from a fuel tank.

In a known tank venting system of this type (German Patent Disclosure DE 195 23 935 A1), where it is called a fuel vapor trapping system, the air pump device used to generate the overpressure in the system for the sake of error diagnosis communicates by its pump outlet with the air inlet of the filter housing, via a flexible compressed air line. A shutoff valve is integrated into the pump housing of the air pump device and controls a direct flow course from the pump inlet of the pump housing, which is occupied by an air filter, and the pump outlet. The air outlet of the filter housing is connected to the intake tube of the engine via a regeneration valve. In the so-called filter or regeneration mode, with the shutoff valve open in order to regenerate the adsorption filter, embodied as an activated charcoal filter, in the filter housing, air is aspirated by means of a negative pressure generated in the engine intake tube; this air flows into the filter housing via the opened shutoff valve in the pump housing, the compressed air line, and the air inlet, and in the fg flows through the adsorption filter and in the process carries fuel vapors that have been deposited there along with it and through the regeneration valve enters in metered fashion into the intake tube. For error diagnosis, the shutoff valve and the regeneration valve are closed, and in the system comprising the tank venting system and the fuel tank the air pump device generates an increased pressure. Once the pressure buildup is concluded, there is a wait for some time until the pressure has dropped again, possibly because of a leak in the tank venting system, in which case the time elapsed until the pressure reduction is a measure of the magnitude of the leakage opening that has occurred.

ADVANTAGES OF THE INVENTION

The tank venting system according to the invention has the advantage of substantially reducing the requisite installation space in the motor vehicle; the hose connection previously usual between the pump outlet of the pump housing and the air inlet of the air filter is omitted. Installing the tank venting system in the motor vehicle is simplified substantially, because the adsorption filter and the air pump device can be premounted as a module. The attendant economy in terms of material costs and reduction in assembly time leads to a marked reduction in production costs. By providing a large-area adsorption filter in the filter housing, the function of the tank venting system is assured over a long service life. It is then possible to do without a separate air filter at the pump outlet of the pump housing, if an air filter is integrated into the filter housing. This is an aid in saving still further installation space. The spring-elastic fastening of the pump housing to the filter housing provides for an acoustical and mechanical decoupling between the two housings.

By the provisions recited, advantageous refinements of and improvements to the tank venting system disclosed are possible.

BRIEF DESCRIPTION OF THE DRAWINGS

The invention is described in further detail below in terms of an exemplary embodiment shown in the drawings. Shown are.

DESCRIPTION OF THE EXEMPLARY EMBODIMENT

Figure 1:
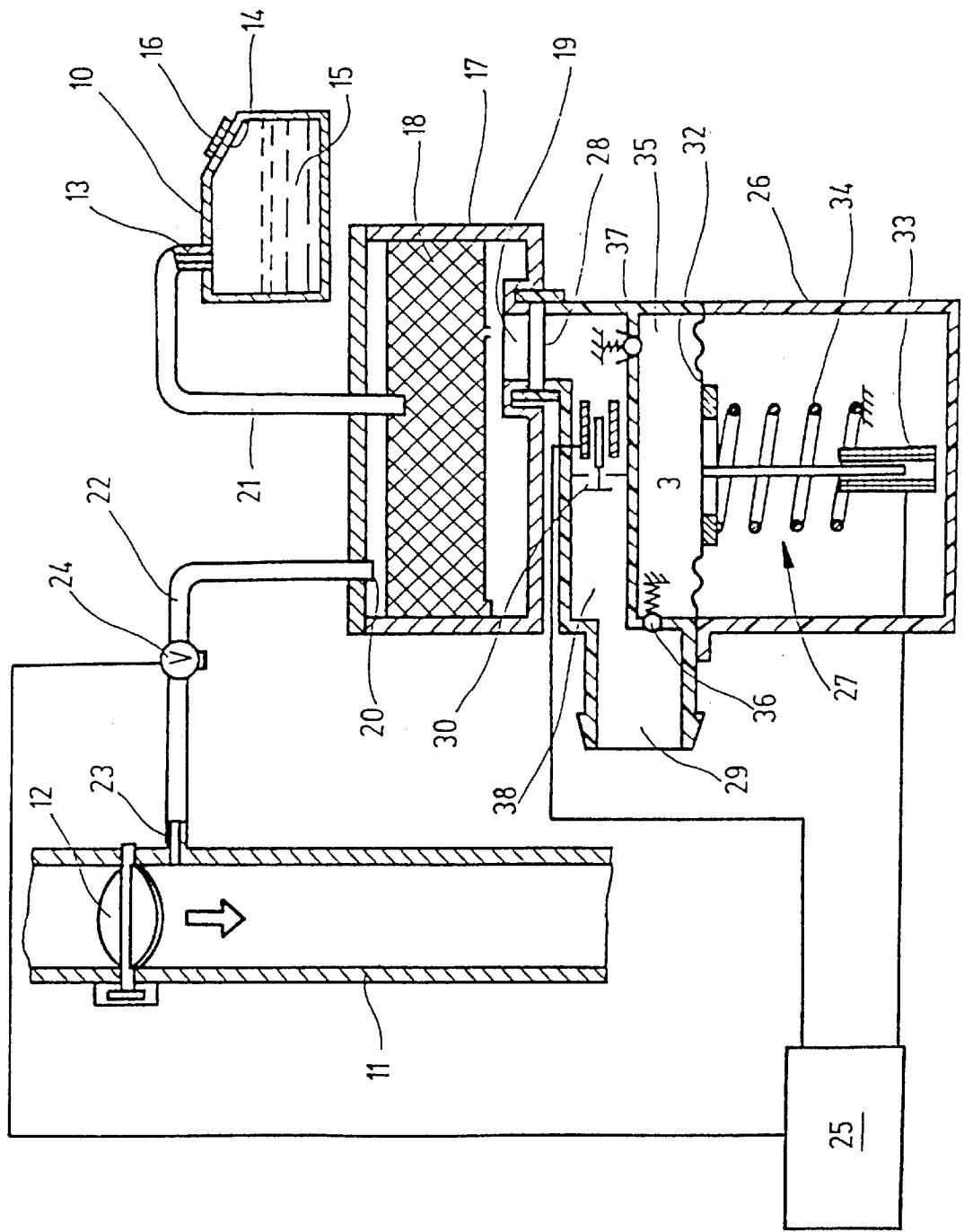
FIG. 1, a schematic sectional view of a tank venting system built into a motor vehicle with an internal combustion engine.

The tank venting system for a motor vehicle with an internal combustion engine, shown schematically in FIG. 1, is disposed between a fuel tank 10 and an intake tube 11, which has a throttle valve 12 of the engine; the connection to the intake tube 11 is made downstream of the throttle valve 12, and the connection to the fuel tank 10 is made upstream of its venting neck 13. The fuel tank 10 is filled with fuel 15 via a filling neck 14. The filling neck 14 can be closed hermetically and in pressure tight fashion by means of a tank cap 16.

The tank venting system has a filter housing 17, in which an adsorption filter 18, preferably embodied as an activated charcoal filter is interchangeably received. The filter housing 17 has an air inlet 19 and an air outlet 20 and communicates with the venting neck 13 of the fuel tank 10 via a connecting line 21. The air outlet 20 communicates via a connecting line 22 with a connection neck 23 on the intake tube 11. A metering or regeneration valve 24 is disposed in the connecting line 22 and is controlled by a control unit 25 as a function of engine operating parameters.

A pump housing 26 of an air pump device 27 is connected by its pump outlet 28 to the air inlet 19 of the filter housing 17. The pump inlet of the pump housing 26 is shown at 29. As can be seen from the sectional view of FIG. 1, a shutoff valve 30 is also accommodated in the pump housing 26. The air pump device 27 includes a pump diaphragm 32, which is driven to execute a reciprocating motion by an electromagnet 33 and a restoring spring 34. The electromagnet 33 is controlled by the control unit 25. The pump diaphragm 32 defines a feeding or pumping chamber 35, which communicates with the pump inlet 29 via an inlet valve 36 and with the pump outlet 28 via an outlet valve 37. A bypass is provided parallel to the pumping chamber 35 and extends between the pump inlet 29 and the pump outlet 28. A shutoff valve 30 embodied as an electromagnet valve is disposed in the bypass 38 and is controlled by the control unit 25 in such a way that in the regeneration mode, with the air pump device 27 inactive, the shutoff valve 30 is opened, while for error diagnosis it is closed. To attain a compact design of the tank venting system that requires only little installation space in the motor vehicle, the pump housing is mounted, with the pump outlet 28 oriented coaxially with the air inlet 19 of the filter housing 17, on the filter housing 17 and secured to the filter housing 17; the transition between the pump outlet 28 and the air inlet 19 is sealed off in airtight fashion. As can be seen from the structural views of FIGS. 2–4, to that end an outlet neck 39 that encompasses the pump outlet 28 is embodied on the pump housing 26 for this purpose, protruding at a right angle from the pump housing 26, and a housing opening 40 that forms the air inlet 19 is recessed from the filter housing 17. The housing opening 40 is surrounded by an annular groove 41. The outlet neck 39 and the housing opening 40 are embodied as coaxial and congruent with one another. For airtight sealing of the pump outlet 28 and the air inlet 19, an elastic sealing sleeve 42 is slipped onto the outlet neck 39, and with its face end remote from the outlet neck 39 this sleeve rests in the annular groove 41.

Figure 2:
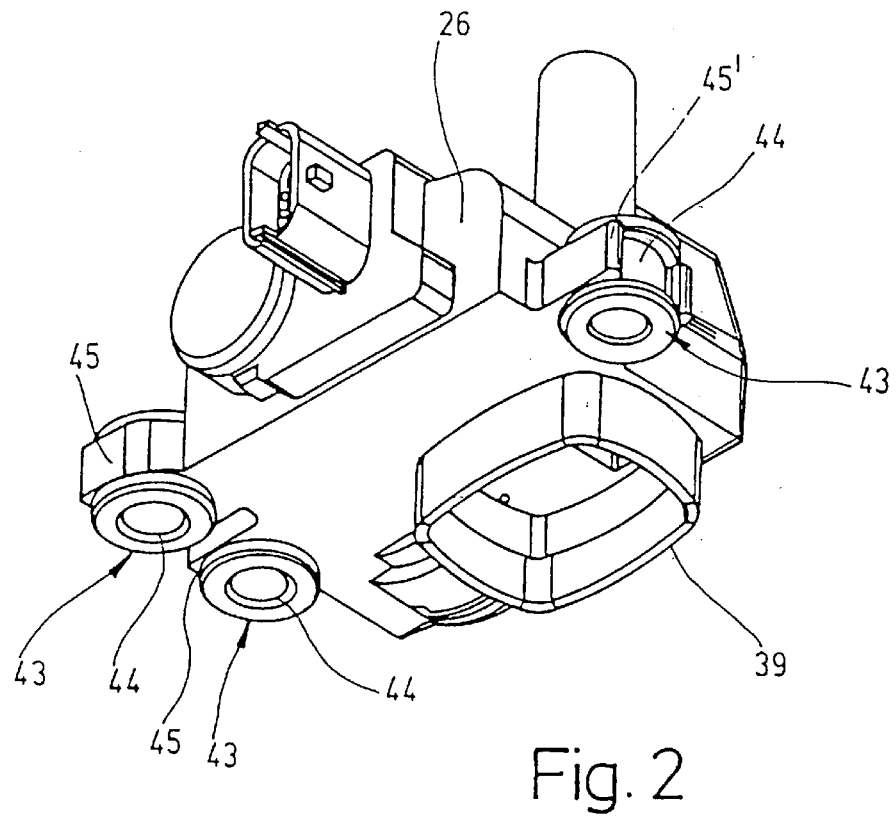
FIG. 2, a perspective view of a pump housing in the tank venting system of FIG. 1.
Figure 3:
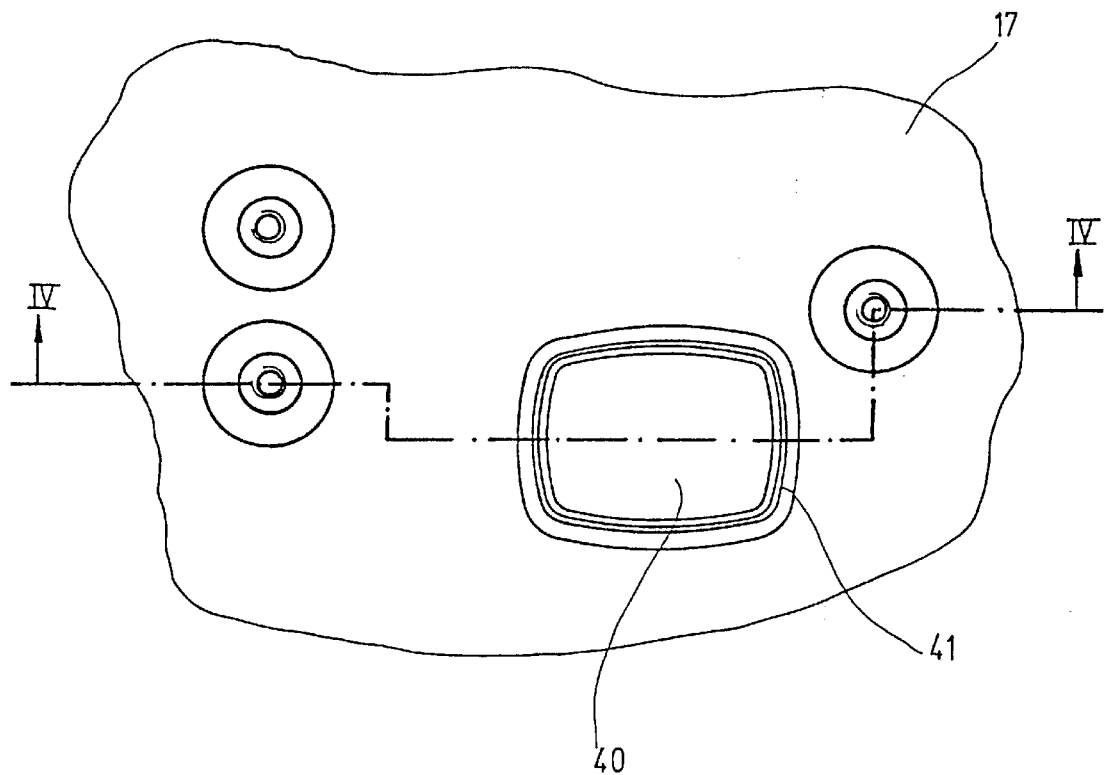
FIG. 3, a plan view of a detail of a filter housing in the tank venting system of FIG. 1.
Figure 4:
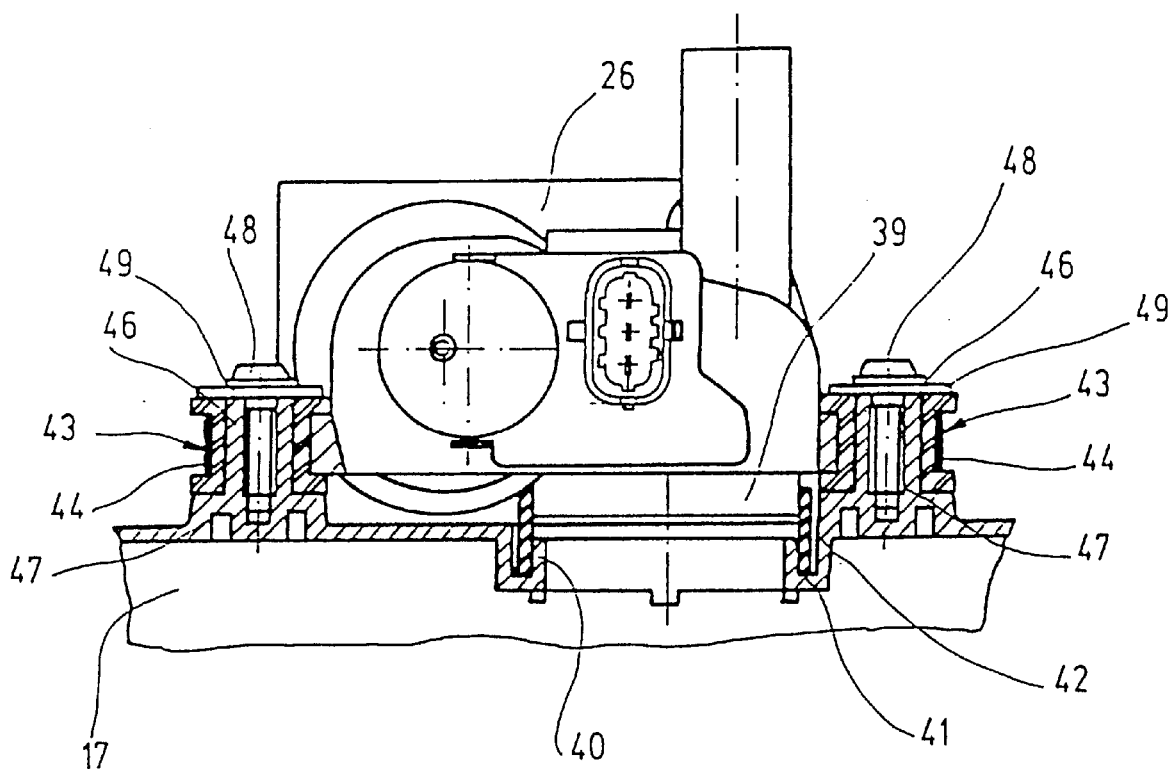
FIG. 4, a longitudinal section taken along the line IV—IV of FIG. 3 of a detail of the filter housing with the pump housing mounted on it.

The fastening of the pump housing 26 to the filter housing 17 is done in an acoustically and mechanically decoupled manner by means of rubber elements 43, of the kind that can be seen in a perspective view in FIG. 2 and in a sectional view in FIG. 4. Each rubber element 43 is embodied as a skeinlike tube 44 with a double-T shape in longitudinal section, and these tubes are received with their middle part form-lockingly in forked retainers 45 formed onto the pump housing 26. The height of each retainer 45 is equivalent to the length of the middle part of the double-T-shaped tube 44, so that this tube is fastened axially undisplaceably between its two flanges in the retainer 45. Receiving protrusions 46 for the tubes 44 protrude at right angles from the surface of the filter housing 17, and a threaded bore 47 is drilled into each of these protrusions. The tubes 44 are slipped onto the receiving protrusions 46 and fastened firmly to the filter housing 17 by means of head screws 48, which are screwed into the threaded bores 47 with the interposition of a shim 49. The tubes 44 protrude slightly past the free end of the receiving protrusions 46.

Although not shown further in the drawing, for filtering the air aspirated via the pump inlet 29, a dust filter can also be provided in the filter housing 17; in that case, it precedes the adsorption filter 18 in the air flow direction.

The mode of operation of the tank venting system in the filtering mode and for error diagnosis is known and is described for instance in DE 195 23 935 A1, so that no further detail on this aspect is needed here.

The foregoing relates to a preferred exemplary embodiment of the invention, it being understood that other variants and embodiments thereof are possible within the spirit and scope of the invention, the latter being defined by the appended claims.

We claim:

1. A tank venting system for motor vehicles, comprising an internal combustion engine supplied from a fuel tank, a filter housing (17), which can be connected to a venting neck (13) of the fuel tank (10), an activated charcoal filter, contained in said filter housing an air inlet (19) and an air outlet (20) in said housing, an air pump device (27) for error diagnosis, which has a pump housing (26) with a pump inlet (29) and a pump outlet (28) that is connected to the air inlet (19) of the filter housing (17), the pump housing (26) with the pump outlet (28) is mounted on the filter housing (17) and secured to the filter housing (17) by means of spring-elastic fastening elements (43), and that a transition between the pump outlet (28) and the air inlet (19) is sealed off in airtight fashion.

2. The system of claim 1, in which the air inlet (19) is oriented coaxially with the pump outlet (28).

3. The system of claim 1, in which the spring-elastic fastening elements are rubber elements (43).

4. The system of claim 3, in which the rubber elements (43) are embodied as skeinlike tubes (44) in a shape of a double T in longitudinal section, which are each received in form-locking fashion by their middle portion in forked retainers (45) formed onto the pump housing (26) and are firmly tightened on the filter housing (17) by means of head screws (48) passed through them.

5. The system of claim 1, in which the pump outlet (28) is embodied as an outlet neck (39) that protrudes from the pump housing (26), and the air inlet (19) is embodied as a housing opening (40) recessed out of the filter housing (17), and that for sealing off a transition between the pump outlet (28) and the air inlet (19), an elastic sealing sleeve (42) is slipped onto the outlet neck (39) and rests with its face end remote from the outlet neck (39) in an annular groove (41) that concentrically surrounds the housing opening (40) in the filter housing (17).

6. The system of claim 1, in which a dust filter is disposed in the filter housing (17), preceding the adsorption filter (18) in a direction of air flow from the air inlet (19) to the air outlet (20).

7. The system of claim 2, in which the spring-elastic fastening elements are rubber elements (43).

8. The system of claim 2, in which the pump outlet (28) is embodied as an outlet neck (39) that protrudes from the pump housing (26), and the air inlet (19) is embodied as a housing opening (40) recessed out of the filter housing (17), and that for sealing off a transition between the pump outlet (28) and the air inlet (19), an elastic sealing sleeve (42) is slipped onto the outlet neck (39) and rests with its face end remote from the outlet neck (39) in an annular groove (41) that concentrically surrounds the housing opening (40) in the filter housing (17).

9. The system of claim 3, in which the pump outlet (28) is embodied as an outlet neck (39) that protrudes from the pump housing (26), and the air inlet (19) is embodied as a housing opening (40) recessed out of the filter housing (17), and that for sealing off a transition between the pump outlet (28) and the air inlet (19), an elastic sealing sleeve (42) is slipped onto the outlet neck (39) and rests with its face end remote from the outlet neck (39) in an annular groove (41) that concentrically surrounds the housing opening (40) in the filter housing (17).

10. The system of claim 4, in which the pump outlet (28) is embodied as an outlet neck (39) that protrudes from the pump housing (26), and the air inlet (19) is embodied as a housing opening (40) recessed out of the filter housing (17), and that for sealing off a transition between the pump outlet (28) and the air inlet (19), an elastic sealing sleeve (42) is slipped onto the outlet neck (39) and rests with its face end remote from the outlet neck (39) in an annular groove (41) that concentrically surrounds the housing opening (40) in the filter housing (17).

11. The system of claim 2, in which a dust filter is disposed in the filter housing (17), preceding the adsorption filter (18) in a direction of air flow from the air inlet (19) to the air outlet (20).

12. The system of claim 3, in which a dust filter is disposed in the filter housing (17), preceding the adsorption filter (18) in a direction of air flow from the air inlet (19) to the air outlet (20).

13. The system of claim 4, in which a dust filter is disposed in the filter housing (17), preceding the adsorption filter (18) in a direction of air flow from the air inlet (19) to the air outlet (20).

14. The system of claim 5, in which a dust filter is disposed in the filter housing (17), preceding the adsorption filter (18) in a direction of air flow from the air inlet (19) to the air outlet (20).

* * * * *